United States Patent [19]

Taylor et al.

[11] 4,048,410

[45] Sept. 13, 1977

[54] ENVIRONMENTALLY DEGRADABLE POLYMER COMPOSITIONS

[75] Inventors: Lynn J. Taylor, Haslett; John W. Tobias, East Lansing, both of Mich.

[73] Assignee: Owens-Illinois, Inc., Toledo, Ohio

[21] Appl. No.: 734,074

[22] Filed: Oct. 20, 1976

Related U.S. Application Data

[63] Continuation of Ser. No. 235,793, March 17, 1972, abandoned.

[51] Int. Cl.$^2$ ................................................ C08J 3/20
[52] U.S. Cl. .............................. 526/22; 260/DIG. 43
[58] Field of Search ................... 260/DIG. 43; 526/22

[56] References Cited

U.S. PATENT DOCUMENTS

| | | | |
|---|---|---|---|
| 3,192,007 | 6/1965 | Turbak | 260/45.75 R |
| 3,287,342 | 11/1966 | Walton | 526/22 |
| 3,549,572 | 12/1970 | Minagawa et al. | 260/23 H |
| 3,560,434 | 2/1971 | Abramoff | 260/45.8 N |
| 3,629,189 | 12/1971 | Minagawa et al. | 260/23 H |
| 3,673,152 | 6/1972 | Minagawa et al. | 260/45.8 N |

FOREIGN PATENT DOCUMENTS

| | | | |
|---|---|---|---|
| 770,202 | 1/1972 | Belgium | 260/DIG. 43 |

*Primary Examiner*—Eugene C. Rzucidlo
*Attorney, Agent, or Firm*—Donald K. Wedding

[57] ABSTRACT

There are disclosed novel degradable plastic compositions consisting essentially of an organic polymer containing at least one organic chelating agent. The agent is one which chelates metal so as to form a metal complex which acts to accelerate polymer degradation in the presence of oxygen, electromagnetic radiation, and/or elevated temperature. This invention is especially useful in the preparation of degradable packaging materials such as films, bags, containers, etc.

8 Claims, No Drawings

ENVIRONMENTALLY DEGRADABLE POLYMER COMPOSITIONS

This is a continuation of application Ser. No. 235,793 filed Mar. 17, 1972, now abandoned.

BACKGROUND OF THE INVENTION

This invention relates to novel plastic compositions having enhanced environmental degradability.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications have created a serious waste disposal problem. Burning of these plastic materials is unsatisfactory since it adds to air pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by microorganisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

One approach to the alleviation of the problem of plastics waste and litter would involve the development of novel polymeric compositions which undergo accelerated degradation under environmental conditions. This general approach has been described in the prior art. For example, reference is made to British patent specification No. 1,128,793, which describes ethylene-carbon monoxide copolymers which undergo rapid deterioration when subjected to sunlight.

An alternative approach involves the use of oxygen, rather than sunlight, as the primary initiator of polymer degradation.

The enhancement of the rate of environmental deterioration of plastics through the use of oxidation-promoting additives is known in the prior art. For example, the preparation of degradable polyolefin films containing certain organic derivatives of transition metals is described in U.S. Pat. No. 3,454,510.

The use of degradation-sensitizing additives, particularly those which accelerate degradation by thermal or oxidative processes, can be complicated as a result of undesired degradation of the polymer composition during the processing of a molten thermoplastic. The invention at bar is intended to avoid this difficult prior art problem.

Instead of adding a degradation-promoting reagent to a polymer at the time of polymer synthesis or at the time of fabrication of plastic articles, it should be possible to add to a polymer a precursor of an intended degradation-promoting reagent, provided the precursor can be converted to the degradation-promoting reagent under environmental conditions. In the present invention an organic chelating agent is utilized as a precursor for a metal chelate; the chelating agent serves to "extract" metal ions from the environment (e.g., from ground water, "rusty" metal, etc.). The metal chelate formed in this manner then acts as an accelerator of the degradation of the polymer.

DESCRIPTION OF THE INVENTION

In accordance with this invention, a novel polymeric composition, degradable under environmental conditions, is prepared by incorporating an organic chelating agent into an organic polymer or copolymer.

More particularly, there is prepared a degradable polymeric composition by incorporating into a polymeric material a metal chelating organic agent in an amount sufficient to cause degradation of the polymeric material when the material and agent are subjected to a catalytic quantity of metal ions in the presence of appropriate environmental agents such as oxygen, electromagnetic radiation, or heat from elevated temperatures.

Typical organic polymers (and copolymers) contemplated especially include polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly(vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly(methyl acrylate), poly(ethyl acrylate), poly(caprolactam), poly(hexamethyleneadipamide), poly(ethylene terephthalate), binyl chloride-vinyl acetate copolymers, styrene-butadiene copolymers, styreneisoprene copolymers, cellulose acetate, cellulose propionate, cellulose acetate butyrate, ethyl cellulose, methyl cellulose, hydroxyethyl cellulose, and hydroxypropyl cellulose. Preferred polymers include polyethylene, polypropylene, poly(4-methyl-1-pentene), polystyrene and polyvinylchloride.

The term "organic chelating agent", as used herein, is defined as a metal chelating organic agent having at least two atoms or groups, each atom or group possessing at least one unshared pair of electrons, and said atoms or groups being suitably situated so as to permit the formation of a metal complex (chelate) in which a metal ion is attached simultaneously, in a cyclic structure, to said atoms or groups. Typically, the unshared pairs of electrons needed for coordination are supplied by nitrogen, oxygen, or sulfur atoms.

Typical examples of organic chelating agents include the following: Ethylenediamine tetraacetic acid and salts thereof, nitrilotriacetic acid and salts thereof; ethylene glycol bis(beta-aminoethyl)ether-N,N,N',N'-tetraacetic acid and salts thereof, hydroxyethyl nitrilodiacetic acid and salts thereof; di(hydroxyethyl)nitriloacetic acid and salts thereof; diethylene triamine pentacetic acid and salts thereof; ethylenediamine tetra(methylene phosphonic acid) and salts thereof; aminotri(methylene phosphonic acid) and salts thereof; 1-hydroxyethylidene-1,1-diphosphonic acid and salts thereof; dodecylaminedi(methylene phosphonic acid) and salts thereof, triethanolamine, diethanolamine; ethanolamine; tetraethanol ethylenediamine; N,N,N',N'-tetramethylethylene diamine, ethylene diamine; diethylene triamine; triethylene tetramine; phthalocyanine; salicyclic acid and salts thereof; glycolic acid and salts thereof; citric acid and salts thereof; tartaric acid and salts thereof; gluconic acid and salts thereof; succinic acid and salts thereof; phthalic acid and salts thereof; oxalic acid and salts thereof; catechol; ethylene glycol;

pyrogallol; acetyl acetone; acetonyl acetone; benzoyl acetone; thenoyl trifluoroacetone; trifluoroacetylacetone; benzil; benzoin; dibenzoylmethane; dipivaloymethane; n-dodecylacetylacetone; n-dodecylbenzoylacetone; 2,2'-bipyridine; 2,2'-biquinoline; 1,10-phenanthroline; 2,9-dimethyl-1,10-phenanthroline, triaminotriethylamine, N-(1-naphthyl)ethylenediamine; salicylaldoxime; α-benzoinoxime; 2-pyridylmethyl ketoxime; glyoxime; α-furildioxime; phenyl 2-pyridylketoxime; N-benzoyl-N-phenylhydroxylamine; 1-nitroso-2-naphthol; 2-nitroso-1-naphthol; quinalizarin; alizarin; 2-methyl-8-hydroxyquinoline; 8-hydroxyquinoline; 8-aminoquinoline; 8-mercaptoquinoline; 2-mercaptobenzothiazole; 2-mercaptobenzimidazole; quinoline-2-carboxylic acid; dithiooxaminde; cupferron; diphenylcarbazone; diphenylcarbazide; anthranilic acid and salts thereof; thiourea; diphenylthiourea; diethyldithiocarbamate salts; diphenylthiocarbazone; glyoxalbis(o-hydroxyanil); o,o'-dihydroxyazobenzene; N,N'-o-phenylenebis(salicylaldimine); N,N',-disalicylidineethylene diamine; N,N'-disalicylidene-1,2-propylenediamine; and 2,3,11,12-dibenzo-1,4,7,10,13,16-hexaoxycyclooctadeca-2,11-diene.

Preferred chelating agents include: n-dodecylacetylacetone; n-dodecylbenzoylacetone; dipivaloylmethane; phthalocyanine; 2,2'-bipyridine; 2,2'-biquinoline; 1,10-phenanthroline; 2,9-dimethyl-1,10-phenanthroline; 8-hydroxyquinoline; N,N'-disalicylidene-1,2-propylenediamine; 2-mercaptobenzothiazole.

The novel plastic compositions of this invention can be made by a number of methods. A preferred method consists essentially of heating a polymer at a temperature below its decomposition temperature, adding the organic chelating agent to the resulting molten polymer, and mixing the chelating agent with the molten polymer to obtain a substantially uniform mixture. The mixture can then be molded and cooled to form a solid molded article. In the alternative, the mixture can be extruded and cooled to form a solid extrudate. Conventional plastic processing equipment can be used for melting the polymer, mixing the polymer with the chelating agent, and molding or extruding the resulting mixture. Processing conditions, such as temperature, time, and pressure will be obvious to those skilled in the art.

Another preferred process for preparing the novel plastic compositions of this invention consists essentially of blending a chelating agent with a solid polymer to obtain a substantially uniform mixture. The polymer is preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and chelating agent. The resulting melt can be extruded or molded and cooled to form a solid extrudate or molded acticle.

The novel plastic compositions of this invention can be prepared at the time of disposal of conventional plastic articles. For example, a plastic article can be crushed, milled or ground, and subsequently mixed with a chelating agent to form a degradable plastic composition.

A preferred process for preparing the novel plastic compositions of this invention consists essentially of casting a film from a composition of a chelating agent and a polymer in an inert solvent. By "inert solvent" is meant that the solvent does not react with the polymer or chelating agent. Use of this method is particularly attractive for preparing coatings and adhesives.

The chelating agent can also be used in a coating composition applied as a solution, slurry, or paste to the surface of a plastic article. The coating composition can be applied by brushing, roller coating, spraying, dipping or printing on the surface of the article.

A composite container in which the polymer and chelating agent are present in adjacent layers can also be constructed.

The novel degradable plastic compositions can also contain non-reactive additives. By the term "non-reactive additives" is meant a chemical additive, filler, or reinforcement commonly used in the formulation of plastic compositions, which does not react with the chelating agent or materially interfere with the subsequent degradation process. For example, the compositions of this invention can obtain additives and processing aids, viscosity depressants, mold-release agents, emulsifiers, and slip agents. The composition of this invention can also contain anti-oxidants, anti-static agents, and fibrous reinforcements which do not materially detract from the degradation of the composition upon exposure to environmental conditions. The compositions of this invention can also contain fillers, such as berium sulphate, calcium carbonate, calcium silicate, fumed colloidal silica, glass, and clay. Flame retardants, lubricants, plasticizers, adhesion promoters and stabilizers, such as those used to prevent thermo-oxidative decomposition can also be used. The additive is generally one which does not detract from the degradation of the novel plastic compositions under environmental conditions. In some cases, it may be desirable to add an antioxidant or stabilizer to permit high-temperature processing, even though the additive may slow degradation. In other cases, it may be desirable to retard degradation for a limited period of time.

In one particular embodiment of the present invention, a degradable adhesive composition containing about 0.5% by weight of 1,10-phenanthroline and about 99.5% by weight of atactic polypropylene is prepared by blending the two materials at a temperature of 90° C. A portion of the resulting mixture is used as an adhesive (hot-melt type) for joining a paper cylinder to a circular piece of steel foil, in order to form a container.

It is contemplated that the novel degradable polymeric compositions of this invention will ordinarily contain about 0.01% to about 10% by weight of the organic chelating agent and about 90 to about 99.99% of the organic polymer. Fillers and other non-reactive additives are not to be considered in calculating these percentages.

It is expected that the soil, ground water, or other materials present in solid waste (e.g., metal cans) will ordinarily serve as sources of the metal ions required for degradation. However, it is also contemplated that a metal or metal compound, such as a metal powder, metal foil, or metal-containing pigment, may be used in the fabrication or decoration of plastic films or articles containing such chelating agents, in order to serve as a source of metal ions for subsequent environmental degradation.

We claim:
1. A process for producing and degrading a polymeric composition comprising:
   a. incorporating into a polymeric material a metal chelating organic agent to form a polymeric composition, and b. subjecting said polymeric blend to a catalytic quantity of metal ions in the presence of oxygen, electromagnetic radiation, or an elevated temperature to degrade said composition, c. the amount of said metal chelating organic agent incorporated in said polymeric material being sufficient to cause degradation of said polymeric composition when subjected to said metal ions in the presence of said oxygen, electromagnetic radiation, or elevated temperature.

2. The process of claim 1 wherein the amount of said metal chelating organic agent added to said polymeric composition is between about 0.01 percent and about ten percent by weight of said polymeric composition.

3. The process of claim 2 wherein the polymeric material is selected from the group consisting of polyethylene, polypropylene, poly (1-butene), poly (4-methyl-1-pentene), ethylene/propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly (vinylidene chloride), polyvinyl fluoride, poly (vinylidene fluoride), polyoxymethylene, poly (ethylene oxide), poly (propylene oxide), polyvinyl alcohol, polyvinyl acetate, polyvinyl formal, polyvinyl butyral, poly (methyl acrylate), poly (ethyl acrylate), poly (caprolactam), poly (hexamethylene adipamide), poly (ethylene terephthalate), vinyl chloride/vinyl acetate copolymers, styrene-butadiene copolymers, styrene/isoprene copolymers, cellulose acetate, cellulose propionate, cellulose acetate butyrate, ethyl cellulose, methyl cellulose, hydroxyethyl cellulose, and hydroxy-propyl cellulose.

4. The process of claim 3 wherein the chelating agent is selected from the group consisting of n-dodecy acetylacetone, n-dodecyl benzoyl acetone, dipivaloylmethane, phthalocyanine, 2,2'-bipyridine, 2,2'-biquinoline, 1,10-phenanthroline, 2,9-dimethyl-1,10-phenanthroline, 8-hydroxyquinoline, N,N'-disalicylidene-1,2-propylene diamine, and 2-mercapto benzothaizole.

5. A process for manufacturing a container comprising a degradable polymeric composition and subsequently degrading said polymeric composition comprising:

a. incorporating into a polymeric material a metal chelating organic agent to form said polymeric composition, b. forming said polymeric composition into a container, and c. subjecting said container to a catalytic quantity of metal ions in the presence of oxygen, electromagnetic radiation, or an elevated temperature to degrade said polymeric composition.

d. the amount of said metal chelating organic agent incorporated in said polymeric material being sufficient to cause degradation of said polymeric composition and said container when subjected to said metal ions in the presence of said oxygen, electromagnetic radiation, or elevated temperature.

6. The process of claim 5 wherein the amount of said metal chelating organic agent added to said polymeric composition is between about 0.01 percent and about ten percent by weight of said polymeric composition.

7. The process of claim 6 wherein the polymeric material is selected from the group consisting of polyethylene, polypropylene, poly (1-butene), poly (4-methyl-1-pentene), ethylene/propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly (vinylidene chloride), polyvinyl fluoride, poly (vinylidene fluoride), poly-oxymethylene, poly (ethylene oxide), poly (propylene oxide), polyvinyl alcohol, polyvinyl acetate, polyvinyl formal, polyvinyl butyral, poly (methyl acrylate), poly (ethyl acrylate), poly (caprolactam), poly (hexamethylene adipamide), poly (ethylene terephthalate), vinyl chloride/vinyl acetate copolymers, styrene butadiene copolymers, styrene isoprene copolymers, cellulose acetate, cellulose propionate, cellulose acetate butyrate, ethyl cellulose, methyl cellulose, hydroxy-ethyl cellulose, and hydroxy-propyl cellulose.

8. The process of claim 7 wherein the chelating agent is selected from the group consisting of n-dodecyl acetylacetone, n-dodecyl benzoyl acetone, dipivaloylmethane, phthalocyanine, 2,2'-bipyridine, 2,2'-biquinoline, 1,10-phenanthroline, 2,9-dimethyl-1,10-phenanthroline, 8-hydroxyquinoline, N,N'-disalicylidene-1,2-propylene diamine, and 2-mercapto benzothiazole.

* * * * *